United States Patent [19]
Erichsen

[11] 4,327,350
[45] Apr. 27, 1982

[54] PRESSURE TRANSDUCER

[75] Inventor: Herman W. Erichsen, Medfield, Mass.

[73] Assignee: Data Instruments, Inc., Lexington, Mass.

[21] Appl. No.: 58,282

[22] Filed: Jul. 17, 1979

[51] Int. Cl.³ ............................................. G01L 1/22
[52] U.S. Cl. ...................................... 338/4; 73/727; 338/42
[58] Field of Search ...................................... 338/2-5, 338/42, 36; 73/720, 721, 726, 727; 357/26; 29/610 SG

[56] References Cited

U.S. PATENT DOCUMENTS

| | | | |
|---|---|---|---|
| 3,168,718 | 2/1965 | Swartz et al. | 338/4 X |
| 3,204,463 | 9/1965 | Taber | 73/726 |
| 3,389,362 | 6/1968 | McLellan | 338/4 |
| 4,141,253 | 2/1979 | Whitehead, Jr. | 338/42 X |

*Primary Examiner*—C. L. Albritton
*Attorney, Agent, or Firm*—Schiller & Pandiscio

[57] ABSTRACT

An improved pressure transducer and method of making the transducer is disclosed. Generally, the transducer is made from sheet materials and is designed to incorporate the advantages of both the beam-type and diffused diaphragm type transducer while reducing or eliminating many of the disadvantages. The product is designed so that multiple units can be provided from a single multi-sheet composite with a relatively high reproducibility at relatively low cost.

14 Claims, 9 Drawing Figures

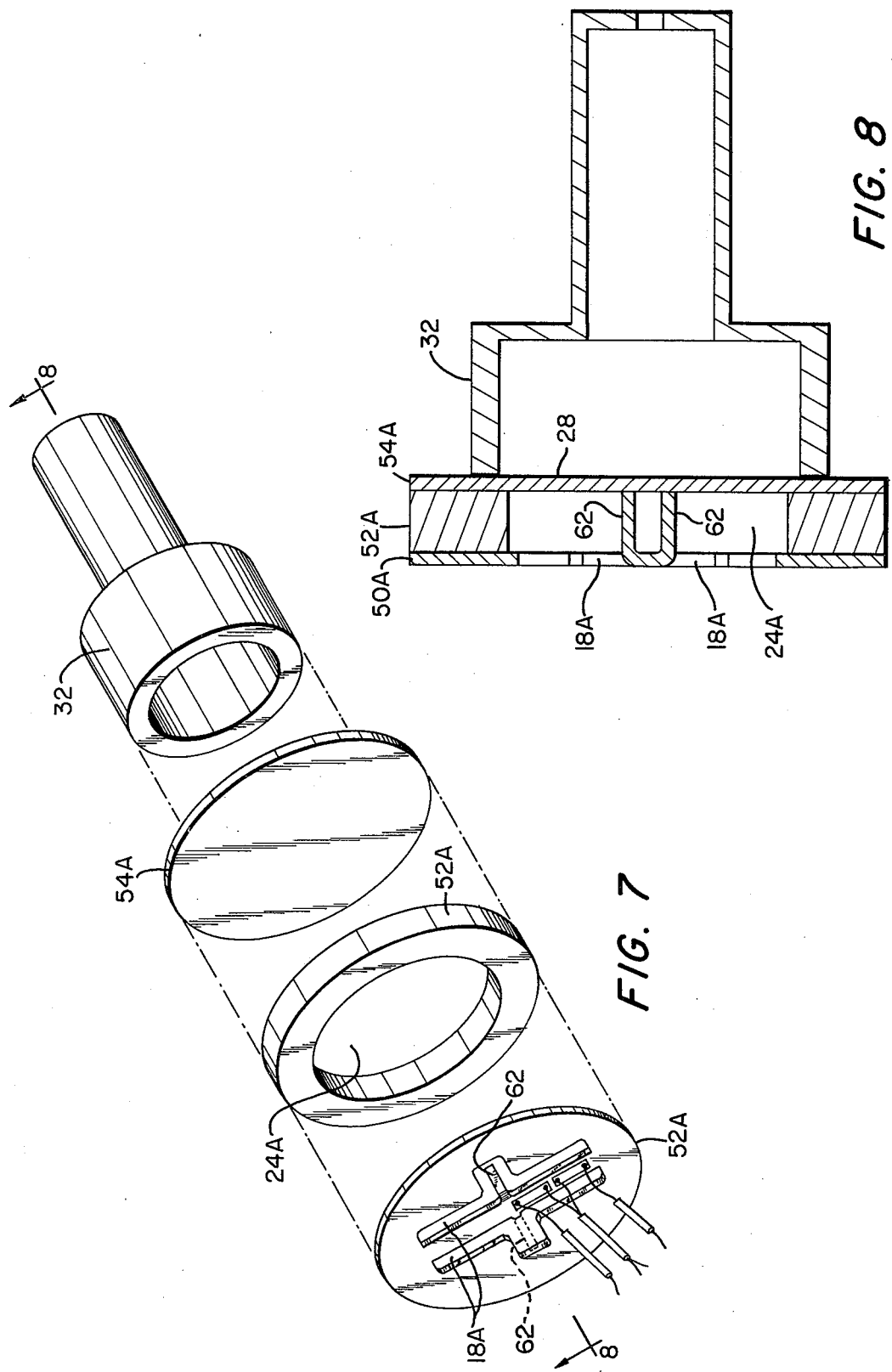

PRESSURE TRANSDUCER

The present invention relates generally to pressure transducers and more particularly to semiconductor strain gage pressure transducers.

Two available, basic types of semiconductor strain gauge pressure transducers are (1) the beam type strain gage pressure transducer, such as the one described in U.S. Pat. No. 3,611,767 issued to J. P. A. Pugnaire on Oct. 12, 1971, and (2) the diffused diaphragm type strain gage pressure transducer, such as any one of those described in *Transducers, Pressure and Temperature,* 1974, a catalogue and handbook of integrated-circuit pressure and temperature transducers published by National Semiconductor Corporation of Santa Clara, Calif.

The beam type transducer, such as that shown in the Pugnaire patent, generally comprises a diaphragm machined as an integral part of a case or made as a separate element and supported by a case. A sensing beam is machined as part of or supported by a supporting structure such as a ring adapted to fit within the case so that deflection of the diaphragm causes the beam to deflect. At least two small doped semiconductor bars made of germanium or silicon are bonded to opposite sides of and along the length of the sensing beam so that one of the bars is subjected to compression and the other to tension when the diaphragm causes the beam to deflect. The bars form two strain gage elements which are then wired into a Wheatstone bridge by connecting the two bars to one another as well as to two external completion resistors. In this latter instance the unit is a one-half active bridge configuration. Alternatively, a fully active bridge configuration can be provided by (1) bonding two bars on each side of the beam so that two are under compression and two under tension when the beam is deflected in response to the deflection of the diaphragm, and (2) appropriately wiring the four bars together to form the Wheatstone bridge. In both the one-half active and fully active configurations, application of pressure to the diaphragm causes the sensing beam to deflect proportionally to the pressure applied. This in turn causes a change in the resistivity of the semiconductor bars bonded to the beam, which in turn produces a voltage or current output of the Wheatstone bridge proportional to the pressure applied.

The diffused diaphragm type of semiconductor strain gage transducer generally comprises a diaphragm etched out of a silicon substrate with semiconductor gages diffused by standard semiconductor fabricating techniques into the surface of the silicon diaphragm. The semiconductor gages (made for example by diffusion of Boron impurities into the silicon substrate) are typically diffused in a Wheatstone bridge configuration in a suitable manner so that when pressure is applied to the diaphragm, the pressure induces strain and thus piezoresistive changes in the diffused gages similarly to those in the beam type transducer described above. This results in an electrical output responsively and proportional to the pressure applied. Generally the diffused diaphragm can be mass produced by, for example, diffusing gages into a silicon wafer at a plurality of locations to form a Wheatstone bridge configuration at each location. The wafer is selectively etched to form a diaphragm (typically in the order of one mil thick) at each such location using standard techniques. The wafer is diced to provide a single diaphragm per die. The die can then be bonded to a support substrate such as glass or silicon to provide a reference chamber or port between the diaphragm and the substrate. The diaphragm-substrate bonding process can be performed in a vacuum so as to form a pressure type vacuum reference cell resulting in an absolute pressure sensor. Alternatively, the addition of the small hole in the substrate can be used to vent the cavity to the atmosphere so as to provide a gage pressure transducer.

One advantage of the beam type transducer is that it provides design flexibility for various applications. Further, the diaphragm can be made of various corrosion resistant materials, e.g., stainless steel, beryllium copper, Inconel X, Monel, etc. The sensing module can be thus protected from the measured media by selecting an appropriate material for the application. The measuring range of the device can be easily altered by changing the diaphragm thickness. The main disadvantage of this type of construction, however, is the relatively large manufacturing cost when compared to that of the diffused diaphragm transducer. Further, the design of the beam type transducer, as described, requires individually machined parts (diaphragm, beam, and accessories) which all must individually be assembled. Automation of the assembly processes necessitates specially designed machinery which is not readily available, and therefore must be custom built. The ultimate cost floor would still be above that desired.

The main advantage of the diffused semiconductor strain gage type is in its apparent low cost of manufacture. Hundreds of sensors can be fabricated from one slice or wafer of silicon using relatively standard integrated circuit manufacturing techniques. However, the diaphragm is made of silicon, which may not necessarily be compatible with the measured media. More specifically, in many applications the measured media must be in contact with the vital parts of the device, e.g., the diffused gage leads, completion resistors, etc. This, therefore, limits the usefulness of the basic device. Often the parts are provided with a protective coating, such as parylene, compatible with many applications. However, even with such a protective coating, due to the fact that the gages are disposed within the thin diaphragm they will be more likely to be subject to and affected by the temperatures of the measured media which directly contact the diaphragm. Other problems associated with the diffused diaphragm type of transducer are encountered in manufacturing. For example, manufacturers have encountered yield problems, i.e., a lack of reproducibility from transducer unit to unit, thereby raising manufacturing costs.

It is therefore, an object of the present invention to provide an improved process of manufacturing semiconductor strain gage pressure transducers which substantially retain those advantages of the two types of prior art devices described, while reducing or substantially eliminating the disadvantages of each.

It is another object of the present invention to provide an improved process of manufacturing semiconductor strain gage pressure transducers which are easily fabricated as an inherently reproducible mechanical structure at relatively low cost.

And other objects of the present invention are to provide an improved low-cost process of manufacturing semiconductor strain gage transducers by fabricating the transducer in mass production in multi-device lots; which results in the fabrication of units to tighter tolerances unit to unit than present techniques, thereby providing increased yield and units which are reproducible; and which provides transducers less sensitive to absolute tolerances than that provided in the diffused diaphragm type.

These and other objects of the present invention are achieved by an improved pressure transducer constructed from sheet materials of predetermined thicknesses. One of the sheets is formed with at least one aperture so as to define a deflection beam. The beam is adapted to carry at least two gage sensors. Another sheet defines a planar, flexible diaphragm portion overlying the beam and fixed (1) so as to be incapable of movement in its plane relative to the beam, and (2) so that (a) the beam will deflect responsively when the diaphragm is deflected in at least one direction, and (b) the sensors will respond so as to indicate the amount of deflection of the diaphragm. By using sheet materials to construct the transducer, a multitude of transducers can be formed and assembled simultaneously from wafers or master sheets, and subsequently diced or cut into individual transducer assemblies preferably using standard semiconductor techniques or alternatively other techniques known in the art.

Other features and many of the attendant advantages of the invention are disclosed in or rendered obvious by the following detailed description which is to be considered together with the accompanying drawings in which:

FIG. 7 is an exploded perspective view of an alternative embodiment of the transducer component parts made in accordance with and incorporating the principles of the present invention;

FIG. 8 is a cross-sectional view of the component parts assembled for use, taken along line 8—8 of FIG. 7.

The same numerals are utilized throughout the drawings to designate similar or like parts.

In all of the embodiments described the essential components of the transducer are made from sheet materials, the thicknesses of which can be easily and carefully controlled, while very low cost manufacturing techniques can be employed in mass producing the transducers with a relatively high rate of reproducibility. The preferred embodiment shown in FIGS. 1-3 is preferably made in accordance with etching and semiconductor techniques as will be more evident from the description of FIG. 5.

Figure 1:
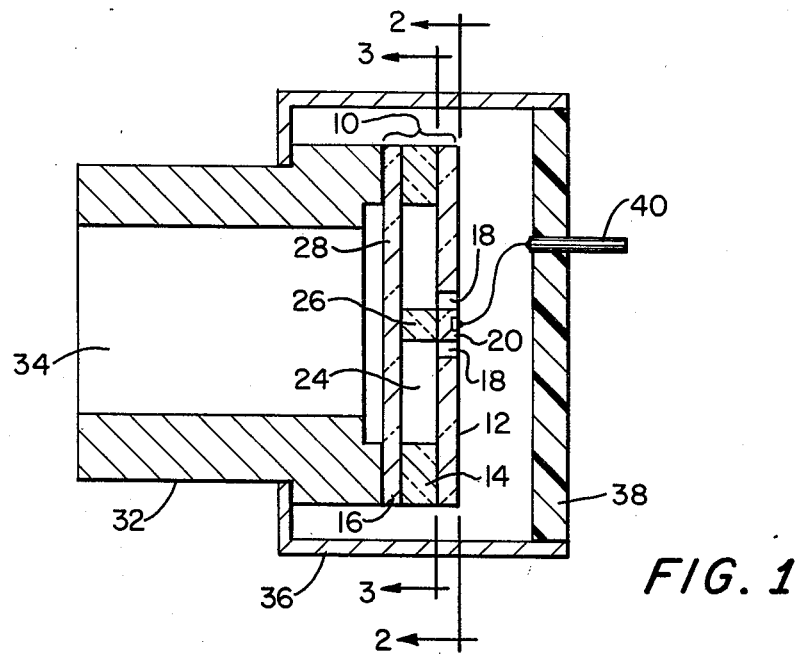
FIG. 1 is a longitudinal cross-sectional view of the preferred embodiment of the transducer component parts made in accordance with and incorporating the principles of the present invention.
Figure 2:
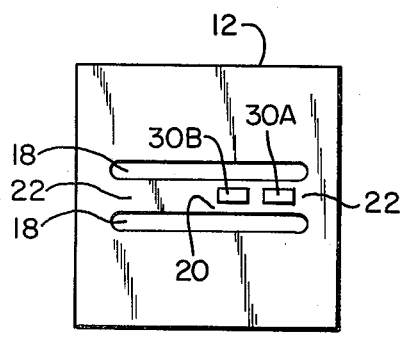
FIG. 2 is a cross-sectional view taken along line 2—2 of FIG. 1.
Figure 3:
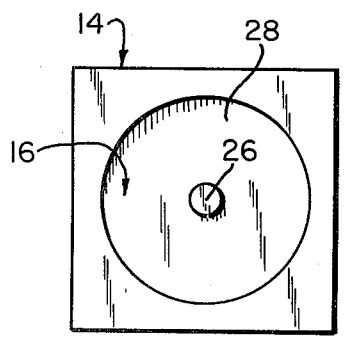
FIG. 3 is a cross-sectional view taken along line 3—3 of FIG. 1.

Referring to FIGS. 1-3, the transducer elements of the embodiment shown from the essential elements of the transducer assembly 10. The preferred assembly 10 comprises a laminated structure of three layers or sheets 12, 14 and 16. The first or beam layer 12, preferably made of silicon, or germanium is of a predetermined thickness and is formed with two apertures 18 so as to form therebetween the deflection beam 20 fixed at opposite ends 22. The crystallographic axis of the semiconductive material of beam layer 12 is selected for optimum sensor characteristics (along the length of beam 20). The intermediate or spacer layer 14 includes a central aperture 24 and force transmitting means in the form of post 26. The third or diaphragm layer 16 is formed of a flexible sheet material of a predetermined thickness. Layers 14 and 16 are preferably made of material having a coefficient of thermal expansion close to that of sheet 12. In the preferred form where sheet 12 is made of silicon, sheets 14 and 16 can be made of a low expansion glass such as fused silica or one manufactured by Corning Glass Works of Corning, New York under the trademark Pyrex. The layers are suitably secured together so that the layers are fixed with respect to each other within their planes and so that layer 16 cooperates with the aperture 24 of spacer layer 14 to define an active diaphragm portion 28. The post 26 is located so that it contacts and is secured to both the approximate center of the beam 20 and diaphragm portion 28.

The laminated structure of layers 12, 14 and 16 can be suitably housed by securing in a sealing manner, the peripheral edge of diaphragm layer 16 to one end of pressure port 32 leaving the other end of the port open at 34. A suitable casing 36 is secured at one end to the port 32 and capped off at its other end with terminal header 38.

Preferably, a one-half active bridge configuration is provided as best shown in FIG. 2, wherein two sensors 30, each preferably of a piezoresistive material, are diffused, ion implanted or otherwise carried by one side of beam 20, i.e. the side of the beam 20 opposite the side facing post 26. When diffused or ion implanted, the doping level of sensors 30 are selected for optimum piezoresistive properties along the crystallographic axis. The sensors 30 are positioned on the beam so that one sensor will be under compression and the other will be under tension when beam 20 deflects responsively to the deflection of diaphragm portion 28. In particular, the sensor 30A is carried by the beam 20 adjacent one end 22 of the beam so that it will be under compression in response to a positive differential pressure, i.e. when the pressure of the measured media in port 32 exceeds the reference pressure in casing 36, and tension in response to a negative differential pressure, i.e. when the pressure of the measured media in port 32 is less than the reference pressure in casing 36. Conversely, sensor 30B is disposed adjacent the center of the beam so that it will be under tension in response to a positive differential pressure and compression in response to a negative differential pressure.

Figure 4:
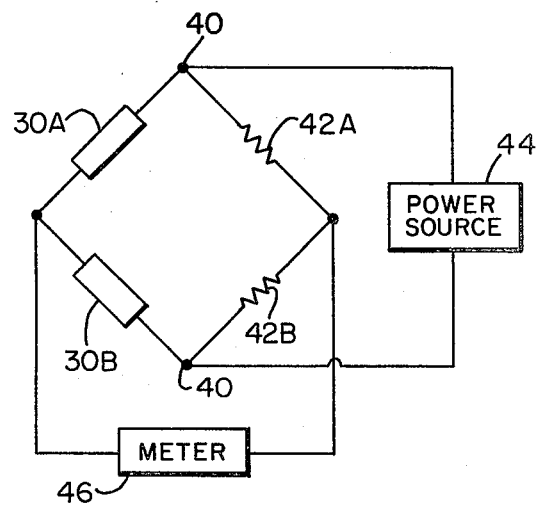
FIG. 4 is a schematic diagram illustrating electrical circuitry of the transducer of the present invention.

As best seen in FIG. 1 sensors 30A and 30B are connected together and to suitable terminals 40 (only one being shown). As shown in FIG. 4, terminals 40 in turn can be connected to external completion resistors 42A and 42B so as to form a bridge circuit, with sensors 30A and 30B forming two arms of the bridge. As well known, a suitable power source 44 is connected to the bridge at opposite nodes so as to impress an equal input signal across the combined two arms of the bridge formed by sensors 30A and 30B, on the one hand and the remaining two arms of the bridge formed by resistors 42A and 42B on the other hand. As well known, a meter 46 is connected across the remaining nodes so that a change in the resistance of sensors 30A and 30B in response to the deflection of beam 20 provides a change in the meter reading. It should be appreciated that two additional gage sensors equivalent respectively to sensors 30A and 30B can be carried by beam 20 so that of the resulting four sensors carried by this beam, two will be under compression and the other two under tension when the beam deflects. In such a configuration the four sensors are suitably connected to form a fully active bridge configuration. As well known in the art, in both types of configurations the bridge is balanced in accordance with techniques well known in the art.

Figure 5:
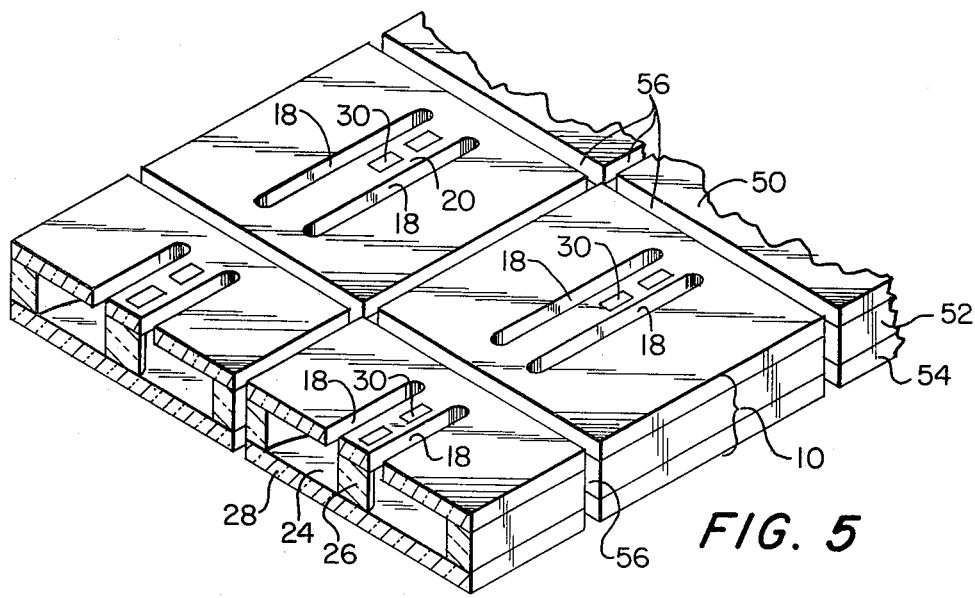
FIG. 5 is a perspective view designed to facilitate an understanding of the preferred low cost technique of manufacturing the embodiment of FIG. 1.

The preferred method of making assembly 10 will now be described with respect to FIG. 5. In particular, assembly 10 is made by forming and assembling three wafers 50, 52 and 54 (corresponding to layers 12, 14 and 16 of a plurality of assemblies 10) so that (1) the beam wafer 50 includes multiple apertures 18 so as to define a plurality of beams 20, each beam carrying the appropriate number of sensors 30, (2) the spacer wafer 52 includes a like plurality of apertures 24 and posts 26 suitably positioned with respect to the respective beams 20, and (3) the diaphragm wafer 54 will form a like plurality of diaphragm portions 28.

Generally, the preferred process includes an etching step to form the apertures 18 and 24, a bonding or fusing step for securing the wafers together and a diffusing or an ion implantation step for forming the sensors 30.

More specifically, the apertures 18 and 24 are formed by appropriately masking wafers 50 and 52 and etching the apertures through each of the prescribed locations of the respective wafers 50 and 52. In the preferred form, where wafer 50 is made of silicon or germanium and wafer 52 is made of a low expansion glass, both can be masked and etched in any known manner, such as by a chemical etching or ultrasonic milling technique, both well known in the art. The sensors 30 are diffused into the wafer 50 at the precise and appropriate locations of each beam formed in wafer 50. This is accomplished by diffusing or ion implanting suitable dopants as, for example boron, into the wafer 50 at each prescribed location.

Wafers 50, 52 and 54 are joined together by either bonding them together or alternatively fusing them together at a relatively high temperature. The resulting composite is then diced to produce the individual assemblies 10, as indicated at 56 in FIG. 5.

The precise sequence of steps of the preferred process is dependent, in part, upon the choice of materials for wafers 50, 52 and 54. Generally, wafers 52 and 54 are first joined together by bonding them together or by a high temperature fusion. Each aperture 24 is then etched at the appropriate location leaving each post 26 intact. It should be appreciated that the resulting active diaphragm porton 28 is not etched and therefore the critical requirements encountered in etching the diaphragm of the diffused-diaphragm type transducer of the prior art so as to control the thickness of the diaphragm is avoided. Where wafer 50 is fused to the resulting combined wafers 52 and 54, the next step of the process is dependent upon the fusion temperature and the resulting temperature occuring when sensors 30 are diffused or implanted in place. Generally, the step requiring the higher temperature is carried out initially. Thus, where the diffusion or implanting temperature is higher than the fusion temperature, the sensors 30 are diffused or implanted in each location prior to fusing in proper registration the wafer 50 to the etched wafer 52 so as to avoid delamination. On the other hand, where fusion occurs at a higher temperature, the unetched wafer 50 is fused to the etched wafer 52. The sensors are then diffused or ion implanted in the precise locations. In either approach, the unetched wafer 50 will be secured in place with respect to the etched wafer 52 with the sensors located in the proper positions. The individual beams 20 are then individually formed by etching apertures 18 in the resulting composite. The resulting composite is then diced to provide the individual assemblies 10.

The resulting diced assemblies 10 can each be suitably secured to pressure port 32 such as by fusing or bonding the peripheral edges of the diaphragm layer 28 to the end of the port. Casing 36 can then be secured in place and sensors 30 connected together as well as suitably connected to terminals 40 while securing terminal header 38 in place. The casing can be sealed so as to provide a predetermined reference pressure for the transducer (such as a vacuum), or alternatively vented to the atmosphere.

Figure 6:
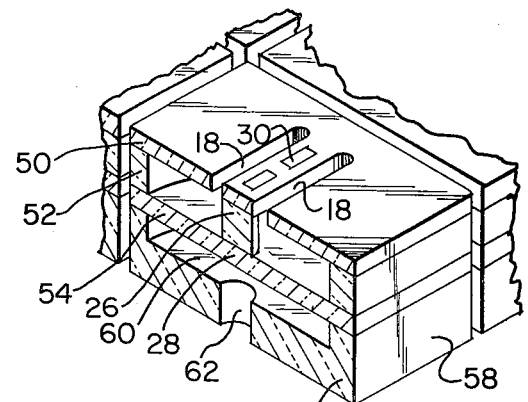
FIG. 6 is a perspective view of a modification to the embodiment of FIG. 1 and the process depicted by FIG. 5.

Although the transducer and its method have been described in its preferred form, several modifications can be made without departing from the scope of the invention. For example, as shown in FIG. 6 a multitude of pressure ports 32A can be made from a single wafer 58, preferably made of a glass such as fused silica, by for example etching or ultrasonically milling the wafer at select locations so as to form the cavities 60, one for each assembly 10, on one side of the wafer. The wafer is further etched or milled to form a port vent 62 connecting each cavity with the opposite side of the wafer 60. During the forming and assembling steps of wafers 50, 52, and 54, the etched wafer 58 is joined by, for example, bonding or fusing the wafer 58 to the wafer 54 so that each cavity 60 faces and circumscribes a respective diaphragm portion 28. The step of joining the wafer 58 to wafer 54 can easily be accomplished following the steps of securing wafer 50 to wafer 52 and forming apertures 24. The remaining steps of forming and assembling the assemblies 10 would be as previously described with respect to FIG. 5 so that when the laminated composite is subsequently diced into the individual assemblies 10, each will include a pressure port 32A equivalent to pressure port 32 of FIG. 1.

Figure 9:
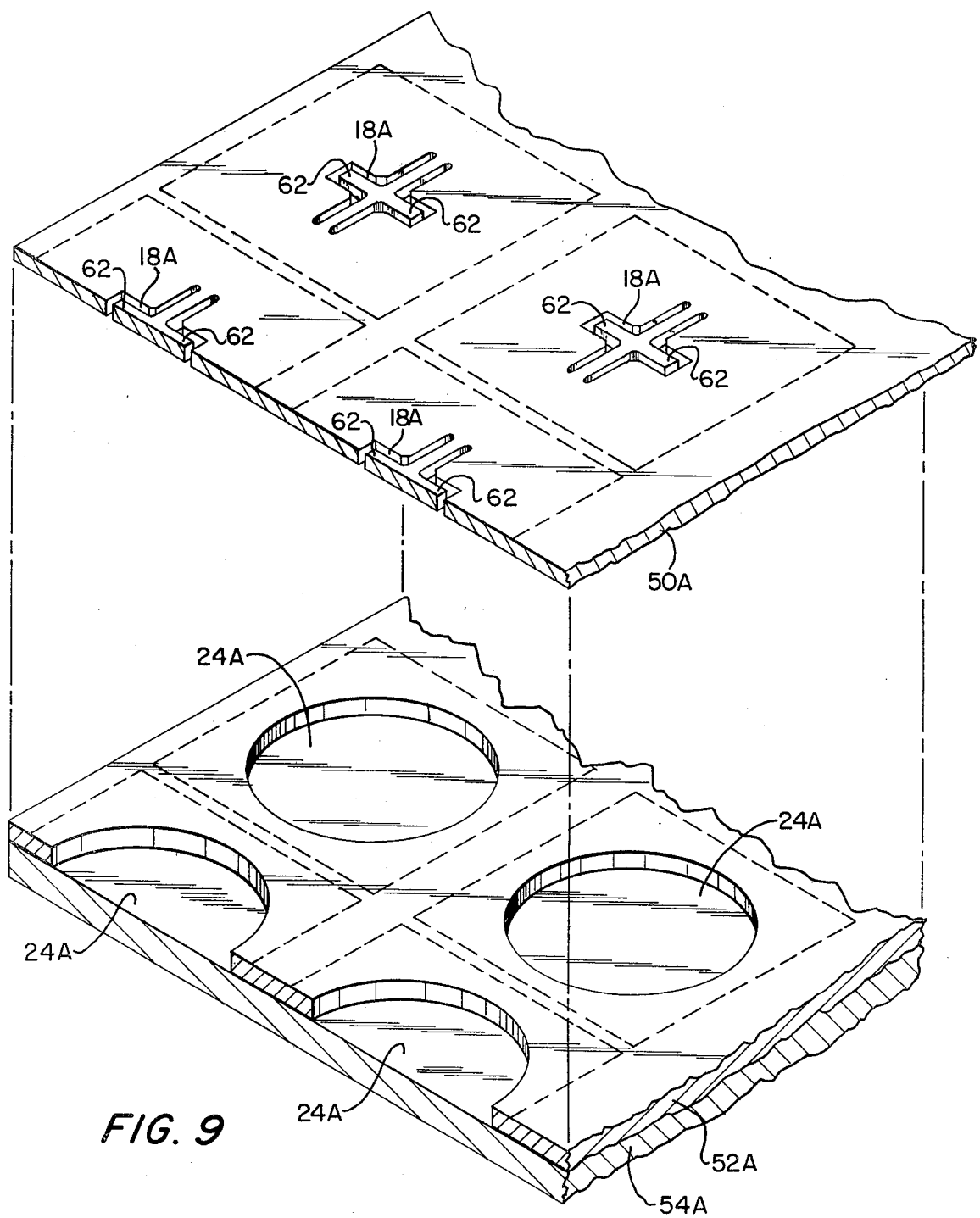
FIG. 9 is an exploded perspective view designed to facilitate an understanding of an alternative method of manufacturing the transducer of the present invention.

Further, along the proposed transducer is made of semiconductor materials and techniques, it should be appreciated that other materials and techniques can be employed. For example, wafers 50 and 52 can be made of metals or metal alloys such as stainless steel and beryllium copper, respectively and hot pressed, metallurgically braized, bonded or otherwise joined together to form a two layer laminate construction. The apertures 24 and ports 26 can then be formed by selectively etching the beryllium copper with any suitable etching solution such as ferricchloride, which will be inert to the stainless steel wafer 54. Similarly, wafer 50 can be made of a metal such as beryllium copper and sensors 30 can accordingly be bonded in place, and apertures 18 can also be easily formed by etching with ferricchloride. Additionally, other techniques for forming the apertures 18 and 24 can be utilized. For example, as shown in FIGS. 7-9, the individual wafers 50A and 52A can be made of metal or metal alloy such as beryllium copper and apertures 18A and 24A can be formed by a metal stamping process. In the embodiment shown, the posts 26 are omitted and circular apertures 24A are formed in wafer 52A, while the force transmitting means is provided by stamping the apertures 18A so as to form at least one and preferably two bendable metal tabs 62 integrally formed with the approximate center of each beam. The wafers 50A, 52A and 54A can then be laminated together by metallurgically brazing, bonding, hot-pressing or other similar technique known in the art. In the latter embodiment the individual tabs can be bent with respect to each beam prior to the lamination step so as to contact the approximate center of the diaphragm portion 28 when the lamination step is carried out. The entire wafer composite can then be diced to produce the individual assemblies with each assembly being secured to a pressure port 32 as shown best in FIGS. 7 and 8.

The design of the assembly of the present invention allows for cost savings since the transducers can be fabricated in multi-unit lots, e.g., 100 or more per composite assembly. A definite advantage further achieved by the design of the assembly is that even though they can be manufactured in multi-unit lots at a low cost, the individual unit can be fabricated to tighter tolerances than with present techniques resulting in increased yield. This is achieved since the thickness of diaphragm portion 28 can be held to extremely tight tolerances since it does not have to be etched in the manner of the diaphragm of the diffused diaphragm type transducer. Generally, it is relatively easier to etch or otherwise form the apertures 18 and 24 in the present invention than form the diffused diaphragm of the prior art while at the same time relying on the same high production technology. The materials chosen for wafers 50, 52 and 54 can be chosen to have different etching parameters so as to etch through sheet 52 while having no effect on wafer 54. Additionally, the sensors are more thermally isolated from the measured media in the pressure port 32 (separated by the diaphragm portion 28, spacer layer 14, and most of the beam layer 16 when compared to the thin diaphragm, typically one mil thick of the diffused diaphragm type transducer). Further, the geometry of the assembly of the present invention is less sensitive to absolute tolerances than that of the diffused diaphragm type transducer of the prior art due to the tight tolerances which the wafers or sheets can be made. For instance, the following results are believed to occur for a transducer assembly of a semiconductor type having diffused sensors for a 15 psi range device with the average strain per sensor of 700 microstrain (measured in microinch per inch). The semiconductor assembly made in accordance with the technique described with respect to FIG. 5 would have an estimated unit-to-unit sensitivity of less than ±10% of nominal.

Comparing this result with a prior diffused diaphragm type transducer assembly having similar dimsensions and design requirements the unit sensitivity would be about ±44% sensor spread on the 0.001 inch thick diaphragm. With the above dimensions it is possible to obtain approximately 100 units from a three inch diameter composite. Similar exercises can be undertaken with units where the sensors are bonded to the beam. Tolerance requirements are always less stringent if one selects the proper diaphragm thickness to beam thickness ratio.

It will be appreciated that although the beam 16 is described as being fixed at both ends, alternatively, a single aperture can be formed so as to form a cantilevered beam fixed at only one end. Further, the layer 14 could be omitted in which case only wafer 50 and 54 would form the initial composite. In this latter situation the shape of the beam would be altered, so that the sensors carried by the beam would provide the response desired when the beam deflects.

Since certain other changes may be made in the above apparatus and process without departing from the principles of the invention herein involved, it is intended that all matter contained in the above description or shown in the accompanying drawing shall be interpreted in an illustrative and not in a limiting sense.

What is claimed is:

1. A pressure transducer comprising:
   a support member;
   a first flat sheet of material comprising (a) two apertures arranged so as to form a beam having first and second opposite ends and (b) a margin section which surrounds said apertures and is coextensive with the periphery of said first sheet;
   a second flat sheet having (a) an outer margin section coextensive with its periphery and (b) an inner section forming a flexible diaphragm which is surrounded by its said margin section, said second sheet being interposed between said support member and said first sheet so that said beam overlies and is spaced from said diaphragm;
   means securing said margin sections of said first and second sheets to said support member so that the ends of said beam are fixed relative to said support member and said diaphragm and beam can flex relative to said support member;
   force transmitting means coupling the approximate center of said beam to said diaphragm so that said beam will deflect responsively when said diaphragm is deflected in at least one direction; and
   at least two strain sensors on said beam responsive to the deflection of said beam, said sensors being located on one side of said beam and arranged so that when said beam deflects in said at least one direction one of said two strain sensors senses a tension change in said beam and the other of said two strain sensors senses a compression change in said beam.

2. A transducer according to claim 1, further including a third sheet of material having a predetermined thickness and being disposed between said first and second sheets so as to space said beam from said diaphragm, said third sheet having an aperture cooperating with said portion of said second sheet so as to define the size of said diaphragm, and further wherein said force transmitting means is disposed in the aperture of said third sheet.

3. A transducer according to claim 1, wherein said first and second sheets have a uniform thickness.

4. A transducer according to claim 2, wherein said force transmitting means is a post member bonded to both said beam and said diaphragm.

5. A transducer according to claim 2, wherein said force transmitting means includes at least one tab integrally formed with said beam, said tab extending from said beam through said aperture to said diaphragm.

6. A transducer according to claim 2, wherein said beam has a first side facing said diaphragm and a second side facing away from said diaphragm, and said at least two sensors are positioned on said second side of said beam.

7. A transducer according to claim 6, wherein said sensors are bonded to said beam.

8. A transducer according to claim 1, wherein said first sheet is made of a semiconductor material and said sensors are diffused into said beam.

9. A transducer according to claim 1, wherein said first and second sheets have a uniform thickness and further comprising a spacer located between and bonded to the margin sections of said first and second sheets.

10. A transducer according to claim 1, wherein said first sheet is made of a semiconductor material and said sensors are ion implanted into said beam.

11. A transducer according to claim 2, wherein said third sheet is bonded to the margin sections of said first and second sheets.

12. A transducer according to claim 1 wherein said at least two sensors are located on the same side of said beam, with one of said at least two sensors located near one end of the beam and the other located near the center of said beam.

13. A transducer according to claim 1 comprising spacer means located between and bonded to the margin sections of said first and second sheets, said force transmitting means comprising a post, and said post and spacer means being made of the same material.

14. A transducer for measuring the pressure of a medium, said transducer comprising:
- a first flat sheet of material having a margin section and including at least two apertures surrounded by said margin section and arranged so as to form a beam therebetween with each end of said beam being integral with said margin section;
- a second flat sheet of material overlying said first sheet along the plane of said first sheet, such second sheet having a margin section overlying the margin section of said first sheet;
- a third sheet of material having a predetermined thickness and being disposed between said first and second sheets, said third sheet having a margin section aligned with the margin section of said first and second sheets and also an aperture surrounded by its margin portion cooperating with at least a portion of said second sheet so that said portion forms a flexible diaphragm;
- force transmitting means coupling the approximate center of said beam to said diaphragm for deflecting said beam responsively to the deflection of said diaphragm in at least one direction;
- means securing together the margin portions of said first, second and third sheets;
- supporting means secured to the side of said second sheet opposite said third sheet in supporting relation to the margin sections of said first, second and third sheets for introducing said medium into contact with said diaphragm and for fixing said ends of said beam;
- at least two strain sensors on said beam on the side thereof opposite to the side of said beam facing said diaphragm and arranged so as to be responsive to the deflection of said beam, said sensors being located so that when said beam deflects in said at least one direction, one of said sensors senses a tension change in said beam and the other of said sensors senses a compression change in said beam.

* * * * *